US012596426B2

(12) United States Patent
Pawar et al.

(10) Patent No.: US 12,596,426 B2
(45) Date of Patent: Apr. 7, 2026

(54) CONTROL OF POWER STATE IN COMPUTER PROCESSOR

(71) Applicant: Intel Corporation, Santa Clara, CA (US)

(72) Inventors: Sagar C. Pawar, Karnataka (IN); Pannerkumar Rajagopal, Karnataka (IN); Raghavendra Nagaraj, Karnataka (IN); Ovais F. Pir, Srinagar (IN); Prakash Pillai, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 768 days.

(21) Appl. No.: 17/809,652

(22) Filed: Jun. 29, 2022

(65) Prior Publication Data

US 2024/0004454 A1 Jan. 4, 2024

(51) Int. Cl.
*G06F 1/3296* (2019.01)
*G06F 1/30* (2006.01)
*G06F 1/3203* (2019.01)
*G06F 1/3234* (2019.01)
*G06F 1/324* (2019.01)
*G06F 9/4401* (2018.01)
*G06F 9/48* (2006.01)

(52) U.S. Cl.
CPC .............. *G06F 1/3296* (2013.01); *G06F 1/30* (2013.01); *G06F 1/3203* (2013.01); *G06F 1/3234* (2013.01); *G06F 1/324* (2013.01); *G06F 9/4418* (2013.01); *G06F 9/4812* (2013.01)

(58) Field of Classification Search
CPC .... G06F 1/3203; G06F 9/4418; G06F 1/3234; G06F 1/324; G06F 9/4812; G06F 1/3296; G06F 1/30; G06F 8/65; G06F 8/61; G06F 8/60
USPC ......... 713/1, 2, 100, 323; 710/260; 717/168, 717/174
See application file for complete search history.

(56) References Cited

U.S. PATENT DOCUMENTS

| | | | | |
|---|---|---|---|---|
| 5,537,656 A * | 7/1996 | Mozdzen | .............. | G06F 1/3203 |
| | | | | 712/228 |
| 6,581,162 B1 * | 6/2003 | Angelo | ................. | G06F 21/602 |
| | | | | 713/193 |
| 2015/0134728 A1 * | 5/2015 | Liao | ...................... | H04L 67/025 |
| | | | | 709/203 |
| 2017/0286332 A1 * | 10/2017 | Kotary | .................... | G06F 13/24 |
| 2017/0293345 A1 * | 10/2017 | Cooper | ................. | G06F 1/3206 |
| 2023/0305834 A1 * | 9/2023 | Kumar | ................. | G06F 9/4418 |

* cited by examiner

*Primary Examiner* — Ji H Bae
(74) *Attorney, Agent, or Firm* — Schwabe, Williamson & Wyatt, P.C.

(57) ABSTRACT

In an embodiment, a processor may include processing circuits to execute instructions. The processor may also include at least one circuit to: detect a management mode trigger event during operation of the processor in a first power state, the management mode trigger event to initiate a management mode in the processor; in response to a detection of the management mode trigger event, switch the processor from the first power state to a second power state; and after a switch of the processor from the first power state to the second power state, initiate the management mode in the processor. Other embodiments are described and claimed.

20 Claims, 7 Drawing Sheets

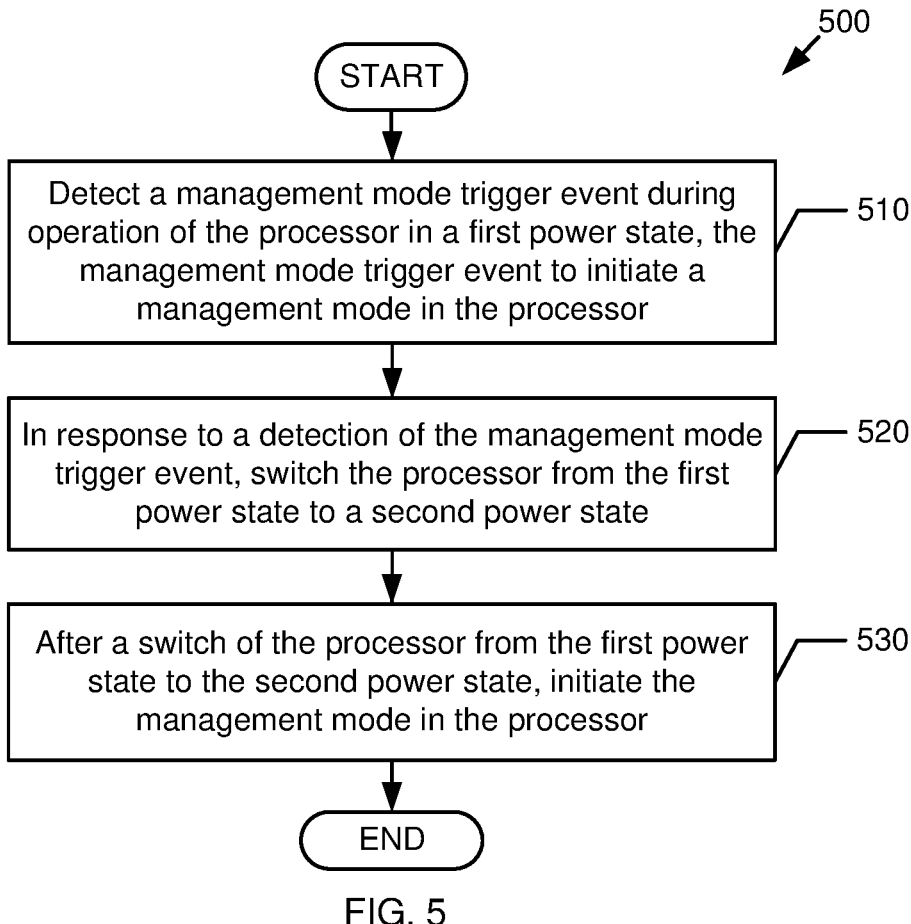

START

Detect a management mode trigger event during operation of the processor in a first power state, the management mode trigger event to initiate a management mode in the processor ⟋— 510

In response to a detection of the management mode trigger event, switch the processor from the first power state to a second power state ⟋— 520

After a switch of the processor from the first power state to the second power state, initiate the management mode in the processor ⟋— 530

END

FIG. 5

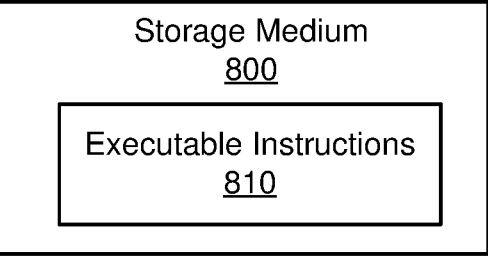

Storage Medium
800

Executable Instructions
810

FIG. 8

CONTROL OF POWER STATE IN COMPUTER PROCESSOR

FIELD OF INVENTION

Embodiments relate generally to computer systems. More particularly, embodiments are related to controlling power states in computer processors.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Further, as the density of integrated circuits has grown, the power requirements for computing systems have also grown. As a result, there is a vital need for energy efficiency and conservation associated with integrated circuits.

BRIEF DESCRIPTION OF THE DRAWINGS

FIG. 5 is a flow diagram of an example method in accordance with one or more embodiments.

FIG. 8 is an illustration of an example storage medium in accordance with one or more embodiments.

DETAILED DESCRIPTION

Figure 1:
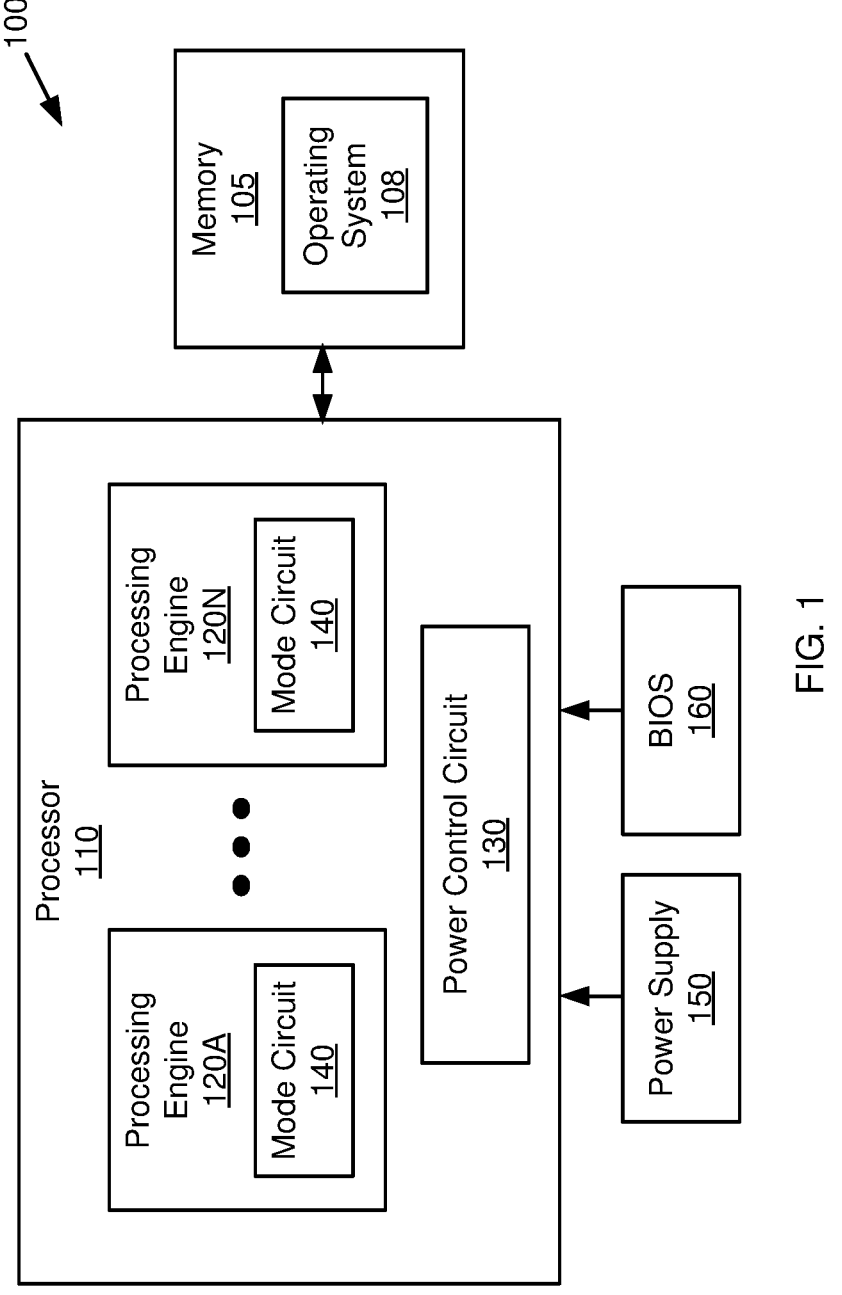
FIG. 1 is a block diagram of an example system in accordance with one or more embodiments.

In some examples, computer processors may operate in multiple execution or operation modes. For example, some processors may operate in a real mode, a protected mode, and a management mode. The real and protected modes may be used when executing the operating system and/or application programs. The management mode may be an execution mode that is transparent to an operating system used by the processor. For example, one management mode available on Intel processors is the System Management Mode ("SMM") specified in the Intel 64 and IA-32 Architectures Software Developer's Manual (provided by Intel® Corporation). The SMM mode may be a special-purpose operating mode for handling functions such as power management, system hardware control, and executing proprietary manufacturer code.

In some examples, the management mode may be entered in response to a trigger event. For example, the management mode may be entered upon receipt of a dedicated management mode interrupt (e.g., a System Management Interrupt (SMI)). The processor may execute the code of the management mode in a reserved memory address space that is not accessible to the other operating modes.

Further, computer processors may be capable of operating at one of multiple different levels of voltage and/or clock frequency, which may be referred to herein as "power states" of the processor. The selection of power state may be based at least in part on the current processing workload. For example, a control circuit may determine that the processor is under a relatively low workload, and may cause the processor to enter a low power state in order to reduce power consumption. In another example, the control circuit may determine that the processor is under a relatively high workload, and may cause the processor to enter a high power state to accommodate the high workload. As used herein, the term "low-power state" may refer to a state using relatively low clock signal and/or voltage, and the term "high power state" may refer to a state using relatively high clock signal and/or voltage.

In some examples, a processor may receive the management mode interrupt while operating in a high power state. Accordingly, the processor may enter the management mode, while also retaining the high power state. However, operating in the management mode may not cause a relatively high workload on the processor. For example, the instructions executed in the management mode may perform relatively simple and short-duration tasks, may not involve heavy calculations, and so forth. Therefore, maintaining the high power state during the management mode may result in relatively high energy consumption and/or heat generation, while failing to provide any useful performance improvement.

In accordance with one or more embodiments, a processor may include circuitry to manage power states and operating modes. In some embodiments, upon detecting a trigger event, the processor circuitry may save data indicating the current context or state of the processor (e.g., values of program counter and registers, memory map, etc.), and may send a notification to the power control circuitry. The power control circuitry may save data indicating the initial power state of the processor (e.g., a high power state), and may then cause the processor to enter a low power state. Further, upon an exit from the management mode, the power control circuitry may restore the processor to its initial power state. In this manner, the power consumption may be reduced while operating in the management mode (i.e., when additional processing performance is not needed), thereby conserving energy and/or reducing thermal load.

FIG. 1—Example System

Referring now to FIG. 1, shown is a block diagram of an example system 100 in accordance with one or more embodiments. In some embodiments, the system 100 may be all or a portion of an electronic device or component. For example, the system 100 may be a cellular telephone, a computer, a server, a network device, a system on a chip (SoC), a controller, a wireless transceiver, a power supply unit, etc. Furthermore, in some embodiments, the system 100 may be part of a grouping of related or interconnected devices, such as a datacenter, a computing cluster, etc.

As shown in FIG. 1, the system 100 may include a processor 110 operatively coupled to memory 105, a power supply 150, and a basic input/output system (BIOS) unit 160. Further, although not shown in FIG. 1, the system 100 may include other components. In one or more embodiments, the memory 105 may be system memory implemented with any type(s) of computer memory (e.g., dynamic random-access memory (DRAM), static random-access memory (SRAM), non-volatile memory (NVM), a combination of DRAM and NVM, etc.). The power supply 150 may provide electrical power to the processor 110. The BIOS unit 160 may include non-volatile memory to store firmware instructions for hardware initialization during the booting process (e.g., power-on startup). The memory 105 may store software including an operating system 108, one or more applications (not shown), and so forth.

In one or more embodiments, the processor 110 may be a hardware processing device (e.g., a central processing unit (CPU), a System on a Chip (SoC), and so forth). As shown, the processor 110 can include any number of processing engines 120A-120N (also referred to herein as "processing engines 120," "processing circuits 120," or "processing cores 120"), a power control circuit 130 (also referred to herein as a "power control unit 130"), and a mode control circuit 140. Each processing engine 120 can execute software instructions. In one or more embodiments, the power control circuit 130 may be a hardware component of the processor 110 to control the power states of the processing engines 120. For example, the power control circuit 130 may control operating frequencies, voltage levels, and so forth.

In some embodiments, the mode control circuit 140 may manage operating modes of the processor 110. For example, the mode control circuit 140 may detect a trigger event to cause the processor 110 to switch from a normal operating mode (e.g., a real mode, a protected mode) to a management mode (e.g., a SMNI mode). In response to the trigger event, the mode control circuitry may save the execution context of the processor, and may send a notification to the power control circuit 130. The power control circuit 130 may save an indication of the current power state of the processor 110 (e.g., a high power state), and may cause the processor 110 to enter a low power state. Further, upon an exit from the management mode, the power control circuit 130 may restore the processor 110 to the previous power state (e.g., the high power state used before entering the management mode). Accordingly, the power consumption of the processor 110 may be reduced while operating in the management mode. The functionality of the power control circuit 130 and/or the mode control circuit 140 is described below with reference to FIGS. 2-9.

Figure 2:
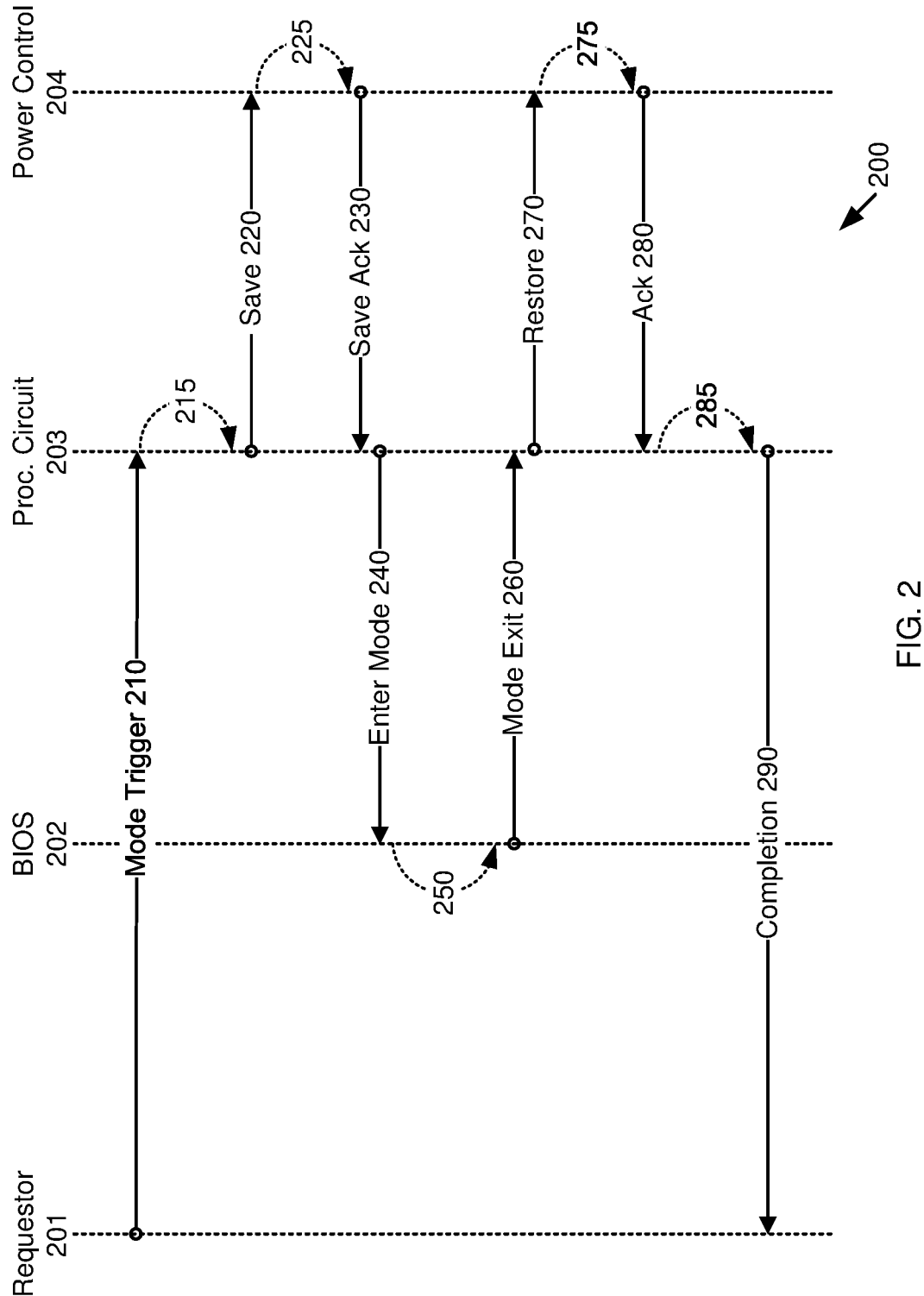
FIG. 2 is an illustration of an example operation in accordance with one or more embodiments.

FIG. 2—Example Operation

Referring now to FIG. 2, shown is an illustration of an example operation 200, in accordance with one or more embodiments. The operation 200 may include various actions associated with a requestor 201, basic input/output system (BIOS) software 202, processing circuit 203, and power control circuit 204.

As shown in FIG. 2, the operation 200 may be initiated by the requestor 201 sending a mode trigger 210 to the processing circuit 203 to initiate a management mode. The requestor 201 may be a hardware component (e.g., circuitry requesting a sleep state, responding to a thermal event, etc.) or software (e.g., operating system, BIOS, application, etc.). In some embodiments, the mode trigger 210 may be a signal or interrupt to initiate a management mode (e.g., a System Management Interrupt (SMI) to initiate the System Management Mode (SMM)).

Upon receiving the mode trigger 210, the processing circuit 203 may perform a save action 215 to save the processing context of the processor 203 (e.g., as saved context data). The processing circuit 203 may send a save notification 220 to the power control circuit 204. For example, referring to FIG. 1, the mode control circuit 140 of each processing engine 120 may receive an SMI interrupt, and in response may store the processing state of the respective processing engine 120, and may send a SMM save notification to the power control circuit 130.

After receiving the save notification 220, the power control circuit 204 may perform a power action 225 including saving the current power state of the processor, and then switching the processor to a low power state. The power control circuit 204 may send a save acknowledgement 230 to the processing circuit 203. For example, referring to FIG. 1, the power control circuit 130 may store data indicating the current power state (e.g., a high power state), and transition the processor to a low power state. Further, after transitioning to the low power state, the power control circuit 130 may send an SMM save acknowledgement to the processing engine 120.

After receiving the acknowledgement 230, the processing circuit 203 may enter 240 the management mode, execute a mode handler 250 (i.e., via firmware of BIOS 202), and exit 260 the management mode. For example, referring to FIG. 1, the power control circuit 130 may store data indicating the current power state (e.g., a high power state), and transitioning the processor to a low power state. Further, after transitioning to the low power state, the power control circuit 130 may send an SMM save acknowledgement to the processing engine 120. The processing engine 120 may enter the SMM mode, and may execute the SMI event handler. Accordingly, the processing engine 120 is switched to the low power state prior to operating in the SMM mode, thereby reducing the power consumption of the processing engine 120 while in the SMM mode. The processing engine 120 may then exit the SMM mode (e.g., by executing a Resume from System Management Mode (RSM) instruction).

After exiting the management mode, the processing circuit 203 may send a restore signal 270 to the power control circuit 204. In response, the power control circuit 204 may restore 275 the processor to the previous power state (e.g., a high power state), and may then send an acknowledgement 280 back to the processing circuit 203. Further, the processing circuit 203 may restore 285 the processing context (e.g., from the saved context data), and may then send a completion notification 290 to the requestor 201. For example, referring to FIG. 1, the processing engine 120 may send a SMM restore notification to the power control circuit 130. In response, the power control circuit 130 may restore the processor to the previous power state (i.e., prior to the SMI interrupt), and may send an SMM restore acknowledgement to the processing engine 120. Further, the processing engine 120 may restore its processing context from saved data, and may then send a completion notification to the requesting entity (e.g., hardware or software) that generated the SMI interrupt.

Figure 3:
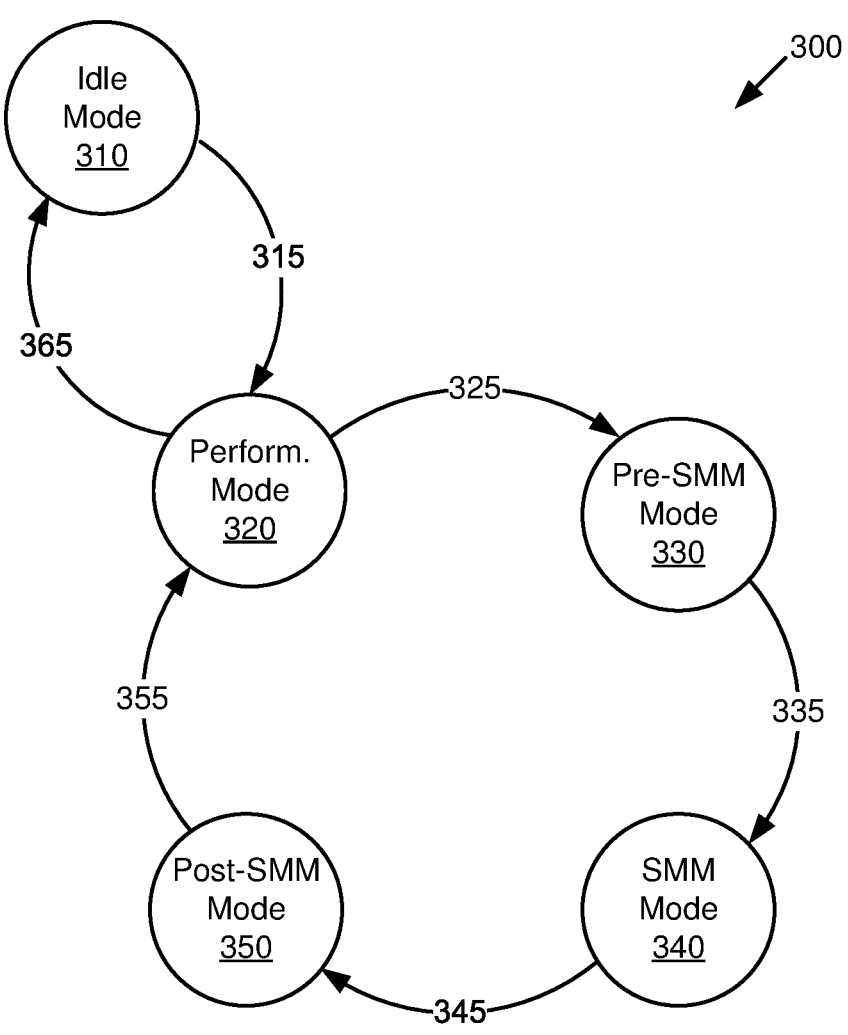
FIG. 3 is an illustration of an example state diagram in accordance with one or more embodiments.

FIG. 3—Example State Diagram

Referring now to FIG. 3, shown is an illustration of an example state diagram 300, in accordance with one or more embodiments. The state diagram 300 may correspond generally to multiple operating states of a processing system (e.g., processor 110 shown in FIG. 1). Specifically, as shown in FIG. 3, the state diagram 300 may include an idle mode 310, a performance mode 320, a pre-SMM mode 330, a SMM mode 340, and a post-SMM mode 350.

The idle mode 310 and performance mode 320 may be non-SMM operating modes (e.g., real mode, protected mode, etc.). The idle mode 310 may correspond to a low power state (e.g., used when a processing circuit is idle), and the performance mode 320 may correspond to a high power state (e.g., used when a processing circuit is under a significant load). When beginning in the idle mode 310, a transition 315 to the performance mode 320 may be performed in response to receipt or detection of a new processing load. For example, upon detecting a new processing load, a power control circuit may increase a clock frequency and/or voltage of the processing circuit(s) (e.g., processing engine(s) 120 shown in FIG. 1).

When operating in the performance mode 320, a transition 325 to the pre-SMM mode 330 may occur in response to receipt or detection of a management mode interrupt (e.g., hardware or software SMI interrupt). During the transition 325, the processor context may be saved, and the processing circuit may send a save notification (e.g., save notification 220) to the power control circuit. Further, when in the pre-SMM mode 330, the power control circuit may determine whether a current power level is higher than a given low power level (e.g., an idle or boot power level). If the current power level is higher than the low power level, the power control circuit may save data indicating the current power level, and may then switch the processing circuit to the low power level. Subsequently, a transition 335 to the SMM mode 340 may be performed. The transition 335 may include sending an acknowledgement (e.g., acknowledgement 230) to the processing circuit(s) (e.g., processing engines 120 shown in FIG. 1).

When in the SMM mode 340, the processing circuit operates in the low power state. Accordingly, the power consumption of the processing circuit may be reduced while in the SMM mode 340. When the SMM mode 340 is no longer needed (e.g., when SMM tasks have been completed), a transition 345 to the post-SMM mode 350 may be performed. The transition 345 may include the processing circuit sending a restore notification (e.g., restore signal 270) to the power control circuit.

When in the post-SMM mode 350, the power control circuit may restore the processing circuit to the previous power state (e.g., the previous high power state). Subsequently, a transition 355 to the performance mode 320 may be performed. The transition 335 may include the power control circuit sending an SMM exit acknowledgement (e.g., acknowledgement 280) to the processing circuit(s). Further, when operating in the performance mode 320, a transition 365 to the idle mode 310 may be performed (e.g., in response to detection of no pending load(s) for the processing circuit).

Figure 4:
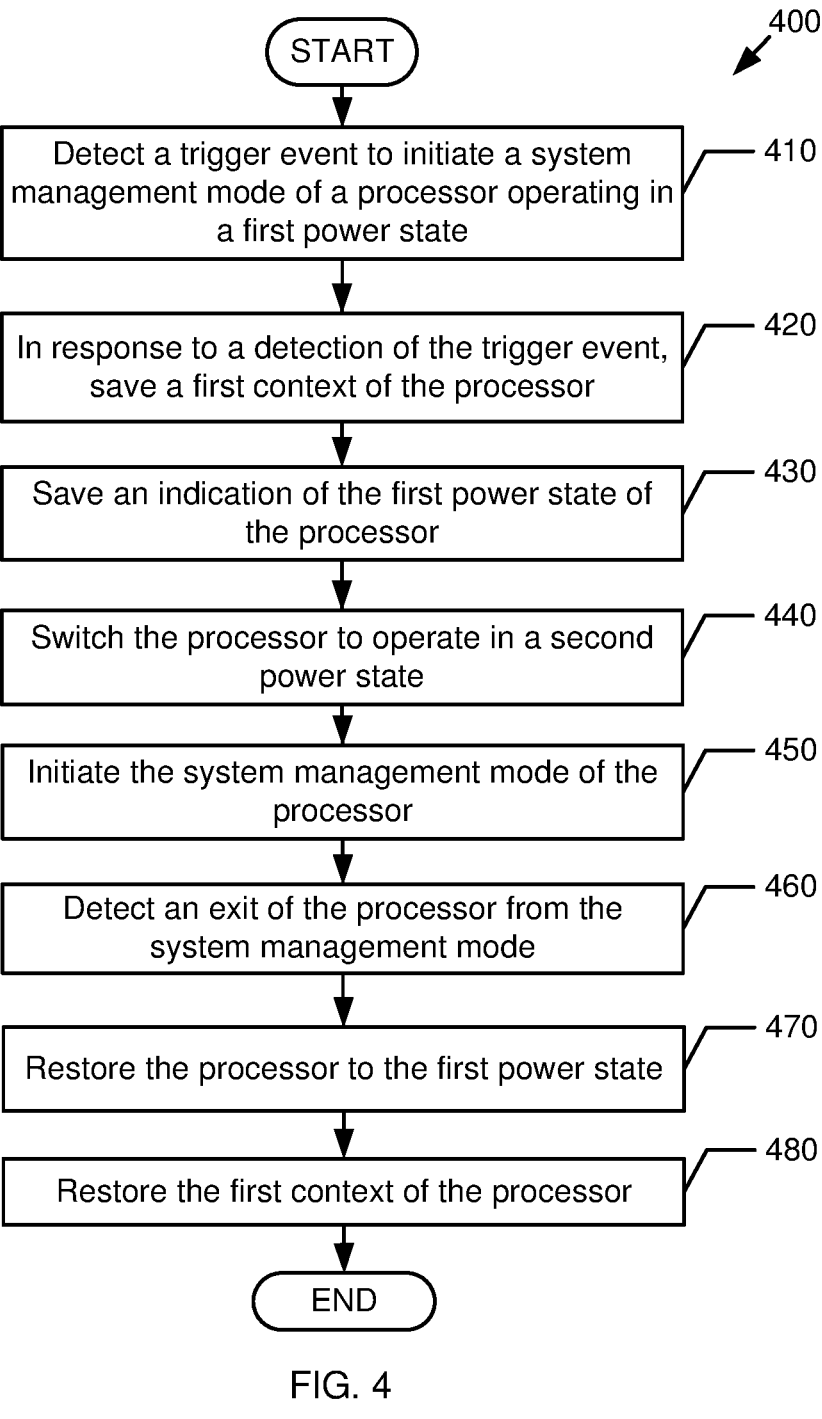
FIG. 4 is a flow diagram of an example method in accordance with one or more embodiments.

FIG. 4—Example Method

Referring now to FIG. 4, shown is a flow diagram of a method 400, in accordance with one or more embodiments. In various embodiments, the method 400 may be performed by processing logic (e.g., processor 110 shown in FIG. 1) that may include hardware (e.g., processing device, circuitry, dedicated logic, programmable logic, microcode, etc.), software and/or firmware (e.g., instructions run on a processing device), or a combination thereof. In firmware or software embodiments, the method 400 may be implemented by computer executed instructions stored in a non-transitory machine-readable medium, such as an optical, semiconductor, or magnetic storage device. The machine-readable medium may store data, which if used by at least one machine, causes the at least one machine to fabricate at least one integrated circuit to perform a method.

Block 410 may include detecting a trigger event to initiate a system management mode of a processor operating in a first power state. Block 420 may include, in response to a detection of the trigger event, save a first context of the processor. For example, referring to FIGS. 1-2, a processing engine 120 may receive a System Management Interrupt (SMI), and in response may store the processing state of the processing engine 120. Further, processing engine 120 may send a System Management Mode (SMM) save notification to the power control circuit 130.

Block 430 may include saving an indication of the first power state of the processor. Block 440 may include switching the processor to operate in a second power state. Block 450 may include initiating the system management mode of the processor. For example, referring to FIGS. 1-2, in response to the SMM save notification, the power control circuit 130 may store data indicating the current power state (e.g., a high power state) of the processing engine 120, and may then transition the processing engine 120 to a low power state. Further, the processing engine 120 may enter the SMM mode, and may execute the SMI event handler. Accordingly, the processing engine 120 may use the low power state while operating in the SMM mode, thereby reducing the power consumption of the processing engine 120 during the SMM mode.

Block 460 may include detecting an exit of the processor from the system management mode. Block 470 may include restoring the processor to the first power state. Block 480 may include restoring the first context of the processor. For example, referring to FIGS. 1-2, the processing engine 120 may complete the SMM tasks, and exit the SMM mode (e.g., by executing a RSM instruction). The processing engine 120 may then send a SMM restore notification to the power control circuit 130. In response, the power control circuit 130 may restore the processor to the previous power state (e.g., the high power state), and may send an SMM restore acknowledgement to the processing engine 120. The processing engine 120 may then restore its processing context from saved data. After block 480, the method 400 may be completed.

FIG. 5—Example Method

Referring now to FIG. 5, shown is a flow diagram of a method 500, in accordance with one or more embodiments. In various embodiments, the method 500 may be performed by processing logic (e.g., processor 110 shown in FIG. 1) that may include hardware (e.g., processing device, circuitry, dedicated logic, programmable logic, microcode, etc.), software and/or firmware (e.g., instructions run on a processing device), or a combination thereof. In firmware or software embodiments, the method 500 may be implemented by computer executed instructions stored in a non-transitory machine-readable medium, such as an optical, semiconductor, or magnetic storage device. The machine-readable medium may store data, which if used by at least one machine, causes the at least one machine to fabricate at least one integrated circuit to perform a method.

Block 510 may include detecting a management mode trigger event during operation of the processor in a first power state, the management mode trigger event to initiate a management mode in the processor. Block 520 may include, in response to a detection of the management mode trigger event, switch the processor from the first power state to a second power state. Block 530 may include, after a switch of the processor from the first power state to the second power state, initiate the system management mode in the processor. For example, referring to FIGS. 1-2, a processing engine 120 may receive a System Management Interrupt (SMI). In response, the processing engine 120 may store the processing state of the processing engine 120, and may send a SMM save notification to the power control circuit 130. In response to the SMM save notification, the power control circuit 130 may store data indicating the current power state (e.g., a high power state) of the processing engine 120, and may then transition the processing engine 120 to a low power state. Further, the processing engine 120 may enter the SMM mode, and may execute the SMI event handler. Accordingly, the processing engine 120 may use the low power state while operating in the SMM mode, thereby reducing the power consumption of the processing engine 120 during the SMM mode.

Figure 6:
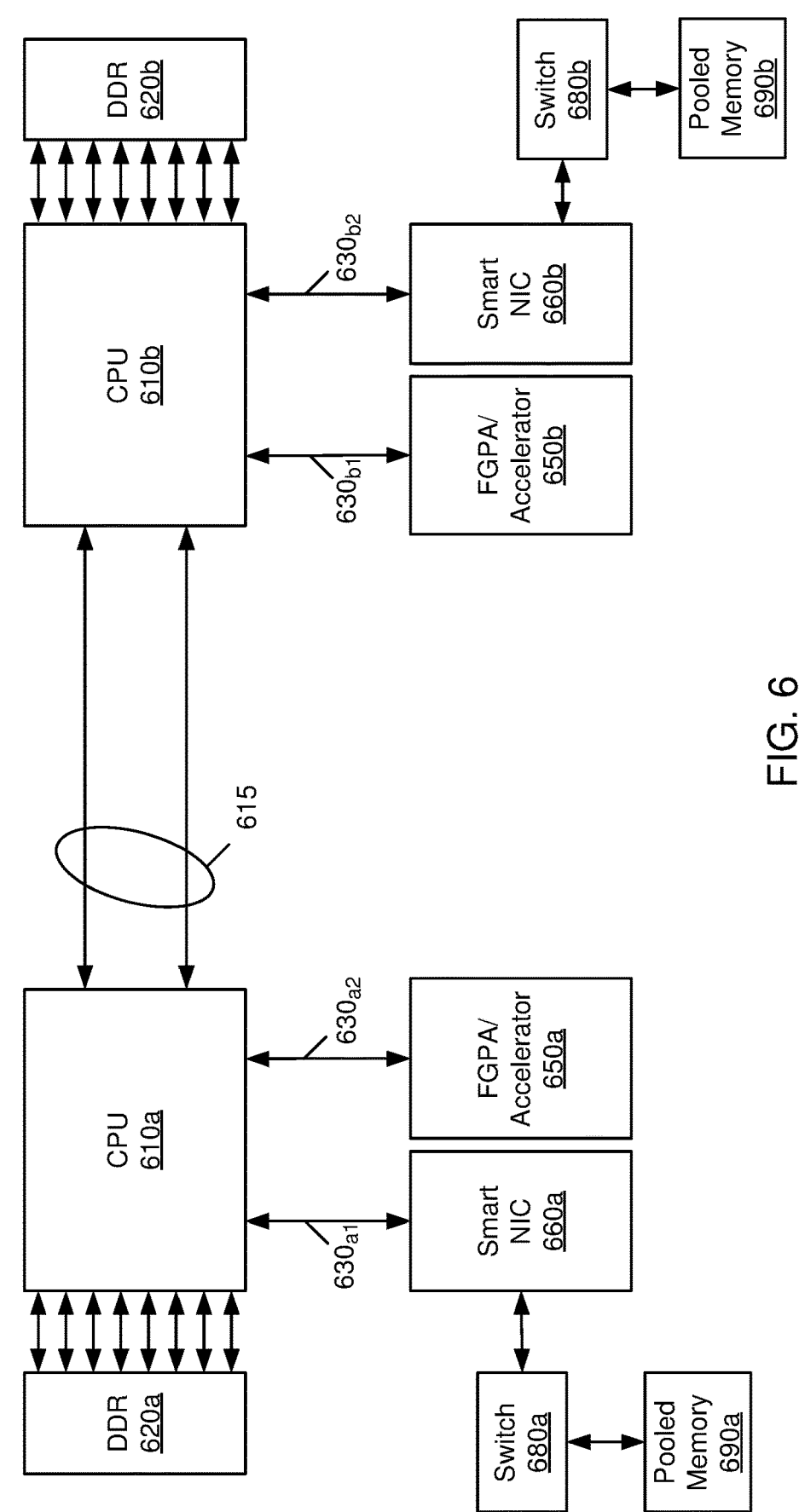
FIG. 6 is a block diagram of an example system in accordance with one or more embodiments.

FIG. 6—Example System

Embodiments may be implemented in a variety of other computing platforms. Referring now to FIG. 6, shown is a block diagram of a system 600 in accordance with another embodiment. In various embodiments, the system 600 may implement some or all of the components, methods, and/or operations described above with reference to FIGS. 1-5.

As shown in FIG. 6, the system 600 may be any type of computing device, and in one embodiment may be a server system such as an edge platform. In the embodiment of FIG. 6, system 600 includes multiple CPUs 610*a,b* that in turn couple to respective system memories 620*a,b* which in embodiments may be implemented as double data rate (DDR) memory. Note that CPUs 610 may couple together via an interconnect system 615, which in an embodiment can be an optical interconnect that communicates with optical circuitry (which may be included in or coupled to CPUs 610).

To enable coherent accelerator devices and/or smart adapter devices to couple to CPUs 610 by way of potentially multiple communication protocols, a plurality of interconnects 630*a*1-*b*2 may be present. In an embodiment, each interconnect 630 may be a given instance of a Compute Express Link (CXL) interconnect.

In the embodiment shown, respective CPUs 610 couple to corresponding field programmable gate arrays (FPGAs)/accelerator devices 650*a,b* (which may include graphics processing units (GPUs), in one embodiment. In addition CPUs 610 also couple to smart network interface circuit (NIC) devices 660 *a,b*. In turn, smart MC devices 660*a,b* couple to switches 680*a,b* that in turn couple to a pooled memory 690*a,b* such as a persistent memory.

Figure 7:
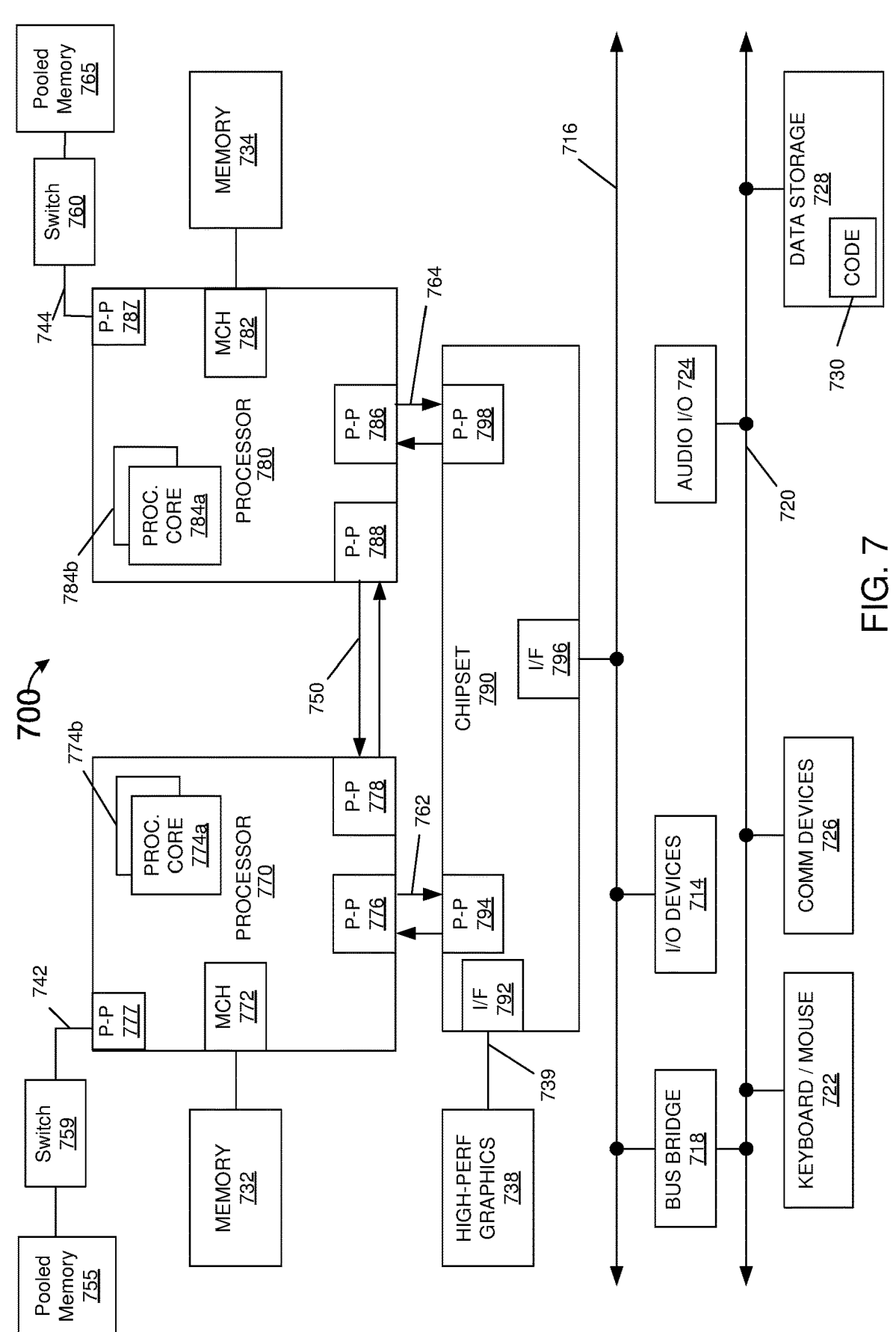
FIG. 7 is a block diagram of an example system in accordance with one or more embodiments.

FIG. 7—Example System

Referring now to FIG. 7, shown is a block diagram of a system 700 in accordance with another embodiment such as an edge platform. In various embodiments, the system 700 may implement some or all of the components, methods, and/or operations described above with reference to FIGS. 1-5.

As shown in FIG. 7, the system 700 includes a first processor 770 and a second processor 780 coupled via an interconnect 750, which in an embodiment can be an optical interconnect that communicates with optical circuitry (which may be included in or coupled to processors 770). As shown in FIG. 7, each of processors 770 and 780 may be many core processors including representative first and second processor cores (i.e., processor cores 774*a* and 774*b* and processor cores 784*a* and 784*b*).

In the embodiment of FIG. 7, processors 770 and 780 further include point-to point interconnects 777 and 787, which couple via interconnects 742 and 744 (which may be CXL buses) to switches 759 and 760. In turn, switches 759, 760 couple to pooled memories 755 and 765.

Still referring to FIG. 7, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 7, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 776 and 786, respectively. As shown in FIG. 7, chipset 790 includes P-P interfaces 794 and 798.

Furthermore, chipset 790 includes an interface 792 to couple chipset 790 with a high performance graphics engine 738, by a P-P interconnect 739. As shown in FIG. 7, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720.

FIG. 8—Example Storage Medium

Referring now to FIG. 8, shown is a storage medium 800 storing executable instructions 810. In some embodiments, the storage medium 800 may be a non-transitory machine-readable medium, such as an optical medium, a semiconductor, a magnetic storage device, and so forth. The executable instructions 810 may be executable by a processing device. Further, the executable instructions 810 may be used by at least one machine to fabricate at least one integrated circuit to perform one or more of the methods and/or operations described above with reference to FIGS. 1-5.

The following clauses and/or examples pertain to further embodiments.

In Example 1, a processor may include a plurality of processing circuits to execute instructions. The processor may also include at least one circuit to: detect a management mode trigger event during operation of the processor in a first power state, the management mode trigger event to initiate a management mode in the processor; in response to a detection of the management mode trigger event, switch the processor from the first power state to a second power state; and after a switch of the processor from the first power state to the second power state, initiate the management mode in the processor.

In Example 2, the subject matter of Example 1 may optionally include that the first power state is a high power operating state of the processor, and that the second power state is a low power operating state of the processor.

In Example 3, the subject matter of Examples 1-2 may optionally include that the management mode is a System Management Mode (SMM), and that the management mode trigger event is a System Management Interrupt (SMI).

In Example 4, the subject matter of Examples 1-3 may optionally include that the at least one circuit comprises: a power control circuit, and a mode control circuit included in a first processing engine of the plurality of processing engines. The mode control circuit may be to, in response to the detection of the management mode trigger event: save a processing context of the first processing engine, and send a save notification to the power control circuit.

In Example 5, the subject matter of Examples 1-4 may optionally include that the power control circuit is to, in response to a receipt of the save notification: store data indicating the first power state; switch the first processing engine from the first power state to the second power state; and send a save acknowledgement to the first processing engine.

In Example 6, the subject matter of Examples 1-5 may optionally include that the mode control circuit of the first processing engine is to, in response to a receipt of the save acknowledgement: enter the management mode; execute a management mode event handler; and send a restore signal to the power control circuit.

In Example 7, the subject matter of Examples 1-6 may optionally include that the power control circuit is to, in response to a receipt of the restore signal: restore the first processing engine to the first power state; and send a restore acknowledgement to the first processing engine.

In Example 8, the subject matter of Examples 1-7 may optionally include that the mode control circuit first processing engine is to, in response to a receipt of the restore acknowledgement: restore the processing context of the first processing engine; and send a completion notification to a requesting entity.

In Example 9, a machine-readable medium may have stored thereon data, which if used by at least one machine, causes the at least one machine to fabricate at least one integrated circuit to perform a method comprising: detecting a management mode request during operation of a processor in a first power state, the management mode request to initiate a management mode in the processor; in response to a detection of the management mode trigger event, transitioning the processor from the first power state to a second power state; and after a transition of the processor from the first power state to the second power state, initiating the management mode in the processor.

In Example 10, the subject matter of Example 9 may optionally include that the first power state is a high power operating state of the processor, and that the second power state is a low power operating state of the processor.

In Example 11, the subject matter of Examples 9-10 may optionally include that the management mode is a System Management Mode (SMM), and that the management mode trigger event is a System Management Interrupt (SMI).

In Example 12, the subject matter of Examples 9-11 may optionally include, prior to the transition of the processor from the first power state to the second power state: saving a processing context of the processor; and storing data indicating the first power state.

In Example 13, the subject matter of Examples 9-12 may optionally include, after initiating the management mode: executing a management mode event handler; and exiting the management mode.

In Example 14, the subject matter of Examples 9-13 may optionally include, after exiting the management mode: transitioning the processor from the second power state to the first power state; and restoring the processing context of the processor.

In Example 15, a system may include a processor, and a system memory coupled to the processor. The processor may include a plurality of processing engines and at least one control circuit. The at least one control circuit may be to: detect a management mode trigger event during operation of the processor in a first power state, the management mode trigger event to initiate a management mode in the processor; in response to a detection of the management mode trigger event, switch the processor from the first power state to a second power state; and after a switch of the processor from the first power state to the second power state, initiate the management mode in the processor; and In Example 16, the subject matter of Example 15 may optionally include that the first power state is a high power operating state of the processor, and that the second power state is a low power operating state of the processor.

In Example 17, the subject matter of Examples 15-16 may optionally include that the at least one circuit comprises: a power control circuit, and a mode control circuit included in a first processing engine of the plurality of processing engines. The mode control circuit may be to, in response to the detection of the management mode trigger event: save a processing context of the first processing engine; and send a save notification to the power control circuit.

In Example 18, the subject matter of Examples 15-17 may optionally include that the power control circuit is to, in response to a receipt of the save notification: store data indicating the first power state; switch the first processing engine from the first power state to the second power state; and send a save acknowledgement to the first processing engine.

In Example 19, the subject matter of Examples 15-18 may optionally include that the mode control circuit of the first processing engine is to, in response to a receipt of the save acknowledgement: enter the management mode; execute a management mode event handler; and send a restore signal to the power control circuit.

In Example 20, the subject matter of Examples 15-19 may optionally include that the power control circuit is to, in response to a receipt of the restore signal: restore the first processing engine to the first power state; and send a restore acknowledgement to the first processing engine.

In Example 21, a method for mode selection may include: detecting a management mode request during operation of a processor in a first power state, the management mode request to initiate a management mode in the processor; in response to a detection of the management mode trigger event, transitioning the processor from the first power state to a second power state; and after a transition of the processor from the first power state to the second power state, initiating the management mode in the processor.

In Example 22, the subject matter of Example 21 may optionally include that the first power state is a high power operating state of the processor, and that the second power state is a low power operating state of the processor.

In Example 23, the subject matter of Examples 21-22 may optionally include that the management mode is a System Management Mode (SMM), and that the management mode trigger event is a System Management Interrupt (SMI).

In Example 24, the subject matter of Examples 21-23 may optionally include, prior to the transition of the processor from the first power state to the second power state: saving a processing context of the processor; and storing data indicating the first power state.

In Example 25, the subject matter of Examples 21-24 may optionally include, after initiating the management mode: executing a management mode event handler; and exiting the management mode.

In Example 26, the subject matter of Examples 21-25 may optionally include, after exiting the management mode: transitioning the processor from the second power state to the first power state; and restoring the processing context of the processor.

In Example 27, a computing device may include: one or more processors; and a memory having stored therein a plurality of instructions that when executed by the one or more processors, causes the computing device to perform the method of any of Examples 21 to 26.

In Example 28, a machine readable medium may have stored thereon data, which if used by at least one machine, causes the at least one machine to fabricate at least one integrated circuit to perform a method according to any one of Examples 21 to 26.

In Example 29, an electronic device may include means for performing the method of any of Examples 21 to 26.

Some embodiments described herein may provide processor circuitry to manage power states and operating modes. In some embodiments, upon detecting a trigger event, the processor circuitry may save data indicating the current context or state of the processor, and may send a notification to the power control circuitry. The power control circuitry may save data indicating the initial power state of the processor, and may then cause the processor to enter a low power state. Further, upon an exit from the management mode, the power control circuitry may restore the processor to its initial power state. In this manner, the power consumption may be reduced while operating in the management mode, thereby conserving energy and/or reducing thermal load Note that, while FIGS. 1-8 illustrate various example implementations, other variations are possible. For example, the examples shown in FIGS. 1-8 are provided for the sake of illustration, and are not intended to limit any embodiments. Specifically, while embodiments may be shown in simplified form for the sake of clarity, embodiments may include any number and/or arrangement of components. For example, it is contemplated that some embodiments may include any number of components in addition to those shown, and that different arrangement of the components shown may occur in certain implementations. Furthermore, it is contemplated that specifics in the examples shown in FIGS. 1-8 may be used anywhere in one or more embodiments.

Understand that various combinations of the above examples are possible. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor, comprising:
a plurality of processing circuits configured to execute instructions; and
at least one circuit configured to:
    detect a management mode trigger event during operation of the processor in a first power state, the management mode trigger event to initiate a management mode in the processor;
    in response to a detection of the management mode trigger event, switch the processor from the first power state to a second power state; and after a switch of the processor from the first power state to the second power state, initiate the management mode in the processor; wherein:
    the at least one circuit comprises a power control circuit and a mode control circuit;
    the mode control circuit is included in a first processing engine of a plurality of processing engines;
    the mode control circuit is configured to, in response to the detection of the management mode trigger event: save a processing context of the first processing engine, and send a save notification to the power control circuit; and
    the power control circuit is configured to, in response to a receipt of the save notification: store data indicating the first power state, switch the first processing engine from the first power state to the second power state, and send a save acknowledgement to the first processing engine.

2. The processor of claim 1, wherein the first power state is a high power operating state of the processor, and wherein the second power state is a low power operating state of the processor.

3. The processor of claim 1, wherein the management mode is a System Management Mode (SMM), and wherein the management mode trigger event is a System Management Interrupt (SMI).

4. The processor of claim 1, wherein the mode control circuit of the first processing engine is configured to, in response to a receipt of the save acknowledgement:
enter the management mode;
execute a management mode event handler; and
send a restore signal to the power control circuit.

5. The processor of claim 4, wherein the power control circuit is configured to, in response to a receipt of the restore signal:
restore the first processing engine to the first power state; and
send a restore acknowledgement to the first processing engine.

6. The processor of claim 5, wherein the mode control circuit of the first processing engine is configured to, in response to a receipt of the restore acknowledgement:
restore the processing context of the first processing engine; and
send a completion notification to a requesting entity.

7. A machine-readable non-transitory medium having stored thereon instructions, which when executed by at least one machine, cause the at least one machine to:
detect a management mode request during operation of a processor in a first power state, the management mode request to initiate a management mode in the processor;
in response to a detection of the management mode request, transition the processor from the first power state to a second power state;
after a transition of the processor from the first power state to the second power state, initiate the management mode in the processor; and
prior to the transition of the processor from the first power state to the second power state: save a processing context of the processor, and store data indicating the first power state.

8. The machine-readable non-transitory medium of claim 7, wherein the first power state is a high power operating state of the processor, and the second power state is a low power operating state of the processor.

9. The machine-readable non-transitory medium of claim 8, wherein the low power operating state has at least one of a lower low clock signal or a lower voltage than the high power operating state.

10. The machine-readable non-transitory medium of claim 7, wherein the management mode is a System Management Mode (SMM), and the management mode request is a System Management Interrupt (SMI).

11. The machine-readable non-transitory medium of claim 7, wherein the instructions, when executed by the at least one machine, cause the at least one machine to, after initiating the management mode:

execute a management mode event handler; and exit the management mode.

12. The machine-readable non-transitory medium of claim 11, wherein the instructions, when executed by the at least one machine, cause the at least one machine to, after exiting the management mode:

transition the processor from the second power state to the first power state; and restore the processing context of the processor.

13. The machine-readable non-transitory medium of claim 7, wherein the saving of the processing context of the processor and the storing of the data indicating the first power state is in response to the detection of the management mode request.

14. The machine-readable non-transitory medium of claim 7, wherein the processor is configured to execute code of the management mode in a reserved memory address space.

15. The machine-readable non-transitory medium of claim 7, wherein the management mode is a special-purpose operating mode for handling at least one of power management, system hardware control, or proprietary manufacturer code.

16. The machine-readable non-transitory medium of claim 7, wherein the processing context comprises at least one of values of program counter, values of a register, or a memory map.

17. A system, comprising:

a processor comprising a plurality of processing engines and at least one control circuit, wherein the at least one control circuit is configured to:

detect a management mode trigger event during operation of the processor in a first power state, the management mode trigger event to initiate a management mode in the processor;

in response to a detection of the management mode trigger event, switch the processor from the first power state to a second power state; and after a switch of the processor from the first power state to the second power state, initiate the management mode in the processor; and a system memory coupled to the processor; wherein:

the at least one control circuit comprises a power control circuit and a mode control circuit;

the mode control circuit is included in a first processing engine of the plurality of processing engines;

the mode control circuit is configured to, in response to the detection of the management mode trigger event: save a processing context of the first processing engine, and send a save notification to the power control circuit; and the power control circuit is configured to, in response to a receipt of the save notification: store data indicating the first power state, switch the first processing engine from the first power state to the second power state, and send a save acknowledgement to the first processing engine.

18. The system of claim 17, wherein the first power state is a high power operating state of the processor, and the second power state is a low power operating state of the processor.

19. The system of claim 17, wherein the mode control circuit of the first processing engine is configured to, in response to a receipt of the save acknowledgement:

enter the management mode;

execute a management mode event handler; and send a restore signal to the power control circuit.

20. The system of claim 19, wherein the power control circuit is configured to, in response to a receipt of the restore signal:

restore the first processing engine to the first power state; and send a restore acknowledgement to the first processing engine.

* * * * *